March 23, 1937.   C. JOHNSON   2,074,696
CONTROL SYSTEM
Filed Feb. 24, 1933   2 Sheets-Sheet 1
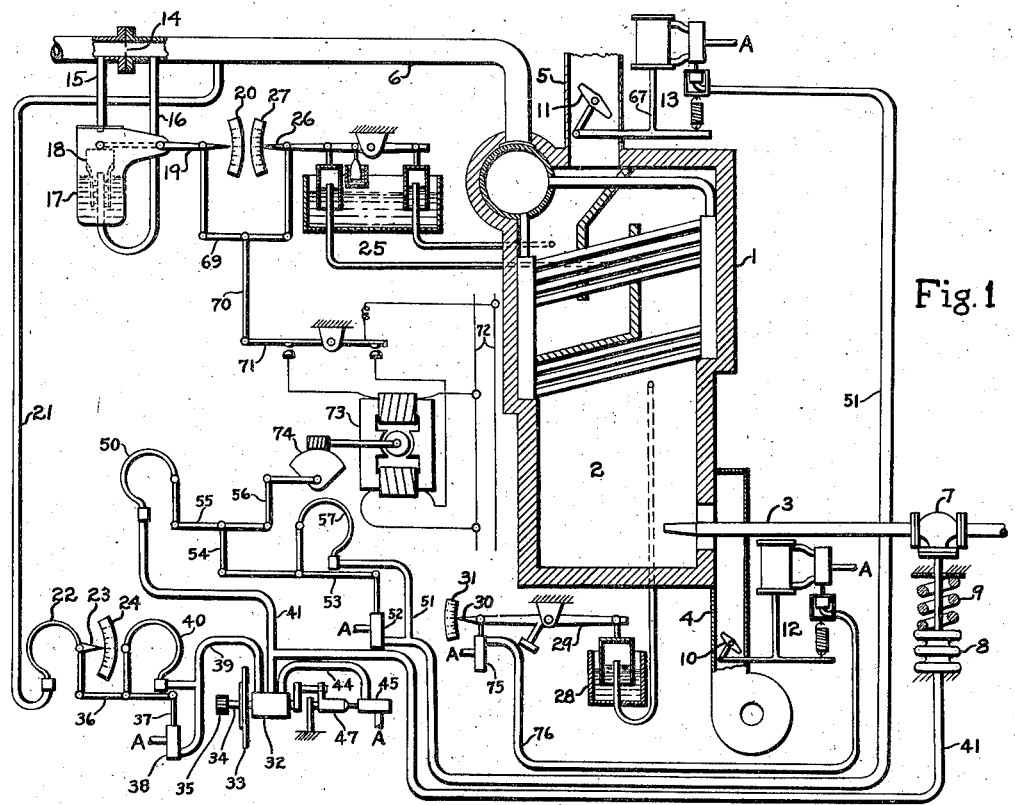
INVENTOR
Clarence Johnson.
BY
Raymond W. Jenkins
ATTORNEY March 23, 1937. C. JOHNSON 2,074,696
CONTROL SYSTEM
Filed Feb. 24, 1933 2 Sheets-Sheet 2
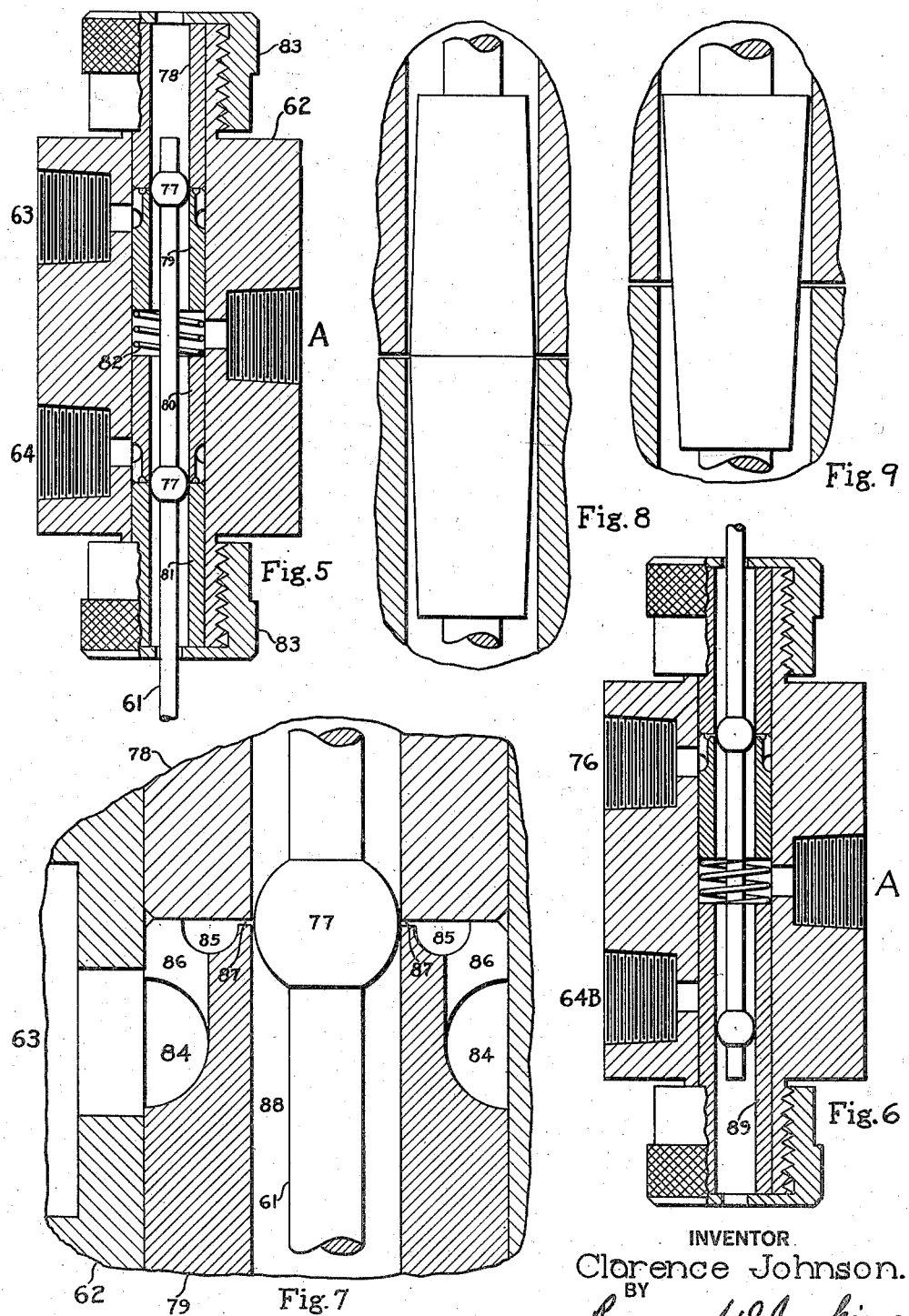
INVENTOR.
Clarence Johnson.
BY
Raymond W. Junkins
ATTORNEY Patented Mar. 23, 1937

2,074,696

UNITED STATES PATENT OFFICE 2,074,696

CONTROL SYSTEM

Clarence Johnson, Cleveland, Ohio, assignor to Bailey Meter Company, a corporation of Delaware Application February 24, 1933, Serial No. 658,376

24 Claims. (Cl. 236—14)

This invention relates to the art of regulation and provides improvements in control or regulating systems and apparatus. It is primarily concerned with hydraulic, pneumatic or fluid pressure operated systems and of a type wherein a pilot valve positioned or moved by a relatively weak control force, in turn controls the application of fluid pressure for producing or controlling an amplified force whereby useful work is accomplished.

The relatively weak control force for positioning the pilot may be derived from any variable quantity, condition, relation, etc., such, for example, as pressure, temperature, flow, or any physical, chemical, thermal, electrical, hydraulic, or other variable or relation of variables. It is not necessarily limited to positioning by such variables but the pilot may be positioned by hand or in accordance with any movement to effect an amplified motion or positioning.

According to my invention, the deflections of a Bourdon tube, galvanometer, or other device, sensitive to the instantaneous magnitude of a variable or to a relation or to a position, may be utilized to control a fluid pressure system, and by suitable fluid pressure actuated devices hereinafter described, the power of the device may be amplified for controlling the operation of dampers, valves, etc., to effect a positioning or a control.

The positioning or control so effected, of dampers, valves, or other apparatus, may react to affect the value of the variable which initiated the control, or may not, as desired.

In carrying out my invention in preferred form, I utilize air under pressure as a pressure fluid which is controlled by a pilot valve for positioning pistons or other apparatus. However, it is not necessary that air be used, as water, oil, or other pressure fluid may equally as well be used. I have chosen, however, as a preferred embodiment, to illustrate and describe my invention in connection with the usage of air under pressure.

One of the primary objects of my invention is to provide a fluid pressure actuated system for controlling the application of an agent to apparatus, in the operation of which apparatus the relation of supply to demand for the agent may cause a variation or change in the value of a variable, which instantaneous value of the variable may be utilized to control the application of the agent.

Another object is to provide an improved pilot valve for controlling the pressure fluid.

A further object is to provide new and novel amplified power units for actually moving dampers, valves, etc., and as controlled by the positioning of the said pilot valves or by control instrumentalities of a similar nature.

Further features of my invention will become apparent from the following description and from the drawings, in which:

Fig. 1 is a somewhat diagrammatic representation of a vapor generator and combustion control therefor, to which the invention has been applied.

Fig. 2 shows a partially sectioned elevation of a pilot valve and power piston.

Fig. 3 is a partially sectioned elevation of a selector valve mechanism.

Fig. 4 is a sectional elevation along the line 4—4 in the direction of the arrows in Fig. 3.

Fig. 5 is a sectional elevation to enlarged scale of the pilot valve of Fig. 2.

Fig. 6 is a sectional elevation to enlarged scale of a pilot valve.

Fig. 7 is an enlarged elevation of a portion of Fig. 5.

Figs. 8 and 9 are enlarged views of a portion of a pilot valve assembly showing modifications in form of the pilot.

Referring first to Fig. 1, I show therein a steam generating boiler 1 having a furnace 2, to which fuel, such as oil, is fed through a pipe 3 and air to support combustion through a conduit 4. The gaseous products of combustion pass from the boiler through an uptake 5. Steam generated in the boiler passes therefrom through a conduit 6 to any point of usage (not shown).

The rate of supply of fuel to the furnace is controlled by the throttling positioning in the pipe 3 of a valve indicated generally at 7 which is in preferred form a balanced valve, having a minimum of resistance to positioning. The valve is shown as having its stem moved responsive to pressure within a metallic bellows 8, one head of which is fixed and whose movement is opposed by a coiled spring 9.

The supply of air to support combustion is controlled by the positioning in the conduit 4 of a damper 10. The outflow of gaseous products of combustion through the uptake 5 is controlled by the positioning therein of a damper 11. For positioning the dampers 10, 11, I show pneumatic fluid pressure controllers illustrated to larger scale and in section at Fig. 2. The controllers are similar for the positioning of the two dampers and are designated at 12 for controlling the damper 10, and at 13 for controlling the damper 11.

For measuring the vapor outflow, I show positioned within the conduit 6 an orifice 14, forming a restriction to flow through the conduit and for creating thereby a pressure differential across the orifice bearing a known relation to the rate of fluid flow therethrough. From the conduit 6, at opposite sides of the orifice 14, I lead the pressure pipes 15 and 16 to a rate of flow meter, indicated in general at 17.

Such a rate of flow meter may be of the liquid sealed bell type as disclosed in the patent to Ledoux No. 1,064,748, granted June 17, 1913, wherein the bell is shaped and has walls of material thickness, to the end that the positioning of the bell is in direct proportion to the rate of fluid flow, thereby correcting for the quadratic relation which exists between rate of fluid flow through such an orifice and differential pressure resulting therefrom. The bell is shown at 18 diagrammatically in dotted lines, and may be sealed by a liquid, such as mercury, whose approximate level within and without the bell is indicated.

Pressure within the conduit 6, ahead of the orifice 14, is effective through the pipe 16 upon the interior of the bell 18, while pressure at the outlet of the orifice 14 is effective through the pipe 15 upon the exterior of the bell 18, to the end that the bell is positioned vertically by the pressure differential across the orifice and in linear relation to the flow of the fluid.

Such vertical positioning of the bell results in an angular positioning about a fixed fulcrum of a lever arm 19, one end of which, remote from the bell 18, forms an indicator moving relative to an index 20 for advising thereby the vertical position of the bell 18 and correspondingly the instantaneous rate of fluid flow through the orifice 14. The index 20 may be graduated in pounds per hour, cubic feet per hour, or any desirable graduations of rate of flow. The construction and functioning of the flow meter 17 is such that movements of the indicator relative to the index 20 are in linear and direct relation to the changes in rate of flow through the orifice 14.

To indicate the pressure of the steam generated by the boiler 1, I join the conduit 6 by a pipe 21 with a Bourdon tube 22. The Bourdon tube carries at its free end a pointer 23 cooperating with an index 24, through the agency of which is advised the instantaneous value of pressure of the steam leaving the boiler.

I measure the flow of gaseous products of combustion through the boiler by a flow meter indicated in general at 25. Through this agency I provide an indication of the instantaneous rate of flow of air through the furnace, and upon proper calibration, may determine the value of total air or excess air in the combustion process.

The air flow meter 25 is connected to points in the boiler passage, between which there is resistance to the flow of the products of combustion, thus producing a pressure differential between the points of connections bearing a known relation to the rate of flow of the air and gases therethrough. Such pressure differences are applied to the underside of liquid sealed bells in the flow meter, the same being of known type and adapted to move an indicator 26 relative to an index 27 proportional to the rate of flow of air through the boiler. By air flow through the boiler as measured by the differences in pressure across a part of the passage through the boiler 1, I mean not only air but all of the products or gases of combustion leaving the furnace through the uptake 5. I refer to the meter 25 as an air flow meter and for the measurement of the rate of flow of air through the furnace, for when the proper calibration and adjustments have been made, the meter, by measuring the rate of flow of all of the air and products of combustion leaving the furnace, will indicate the rate of flow of air supplied for combustion.

At 28, I indicate a furnace draft indicator comprising a liquid sealed inverted bell, to the underside of which is applied the pressure existing in the furnace. The bell is pivotally suspended from a beam 29, having a suitable counterweight or pendulum means for stabilization and provided at one end with an indicator 30 cooperating with an index 31, for advising the instantaneous value of draft or pressure within the furnace 2.

I employ the meters or indicators mentioned to control the supply of the elements of combustion to the furnace, to meet the requirements set up by deviation from desired standards of value or relationship of the variables whose instantaneous value are so metered. The meters or indicators mentioned have relatively small available power for actuating control instrumentalities and in connection therewith I provide amplifying means forming or comprising important elements of the present invention. Either directly or through inter-relation, I position pilot valves by the various meters or indicators for the control of a pressure fluid which is utilized in connection with pistons or similar devices to provide an amplified force for positioning the various regulating devices, such as the dampers 10, 11 and the fuel supply valve 7.

The meters and indicators which form a visual guide for the operator, as well as establishing positions representative of value or relationship of values for controlling the control instrumentalities, are desirably mounted on a gage or panel board for observation by the operator. Located on such a panel board for ready manipulation by the operator is what I term a selector valve, indicated in general at 32, for allowing the operator to control the functioning of the vapor-generator by hand or automatically, as may be desired. The selector valve is supported by the panel of which I indicate at 33 a small portion. Projecting through the panel is the shaft 34 carrying at its free end a knob or a handle 35 which may be grasped by the operator for turning the selector valve. I show in greater detail at Fig. 3 and in section at Fig. 4 the construction of this selector valve.

For a motive fluid utilized in the hand or automatically controlled positioning of the valve 7 and the dampers 10, 11, I use compressed air, although such pressure fluid might equally as well be water, oil or any desirable and well known type of fluid. At the various points throughout the drawings where air under pressure is available, I indicate the broken ends of such supply pipes by the designation A. I do not feel that it is necessary to show that all of these supply points A lead to a compressor or storage tank, or other source of supply, for such is a well known expedient.

I desire to establish a primary control of the supply of fuel to the furnace by positioning of the valve 7, and of the total flow of products of combustion from the furnace by positioning the damper 11, both responsive to pressure of the vapor leaving the boiler or departure of such pressure from a predetermined value. To this end I utilize the positioning of the Bourdon tube 22 whose free end carries the indicator 23, to move substantially vertically one end of a floating beam 36, the other end of which is adapted to position vertically the pilot 37 of a pilot valve 38. Such positioning of the pilot 37 controls the pressure of air in a pipe 39 leading to the selector valve 32 and to a Bourdon tube 40. The free end of the Bourdon tube 40 is pivotally connected to the beam 36 intermediate its ends, and the arrangement is such that if steam pressure effective upon the Bourdon tube 22 varies, for example, in an increasing direction from a predetermined value, then the free end of the Bourdon tube 22 moves upward, causing the pilot 37 to move downward and allow a greater air pressure to be effective within the pipe 39 through the pilot valve 38, as will be explained later.

Such increase in air pressure within the pipe 39 is effective upon the Bourdon tube 40, causing its free end to move upwardly, thus bringing the pilot 37 back upwardly a certain amount until a balance is established wherein the pressure within the pipe 39 is in each case a definite predetermined pressure for each position of the indicator 23 relative to the index 24, and thus a definite pressure for each definite steam pressure.

Having now established in the pipe 39 an air pressure proportionate to or representative of the steam pressure, I illustrate in Fig. 3 and Fig. 4 that through the shown position of the selector valve 32, the pressure is the same in a pipe 41. Within the selector valve 32 is a rotatable plug 42, generally conical in shape, and adapted to be rotated through the shaft 34 by the knob 35. In the shown position, a slot 43 in the surface of the plug communicates between the pipes 39, 41.

When the plug 42 is rotated a few degrees in either direction by the operator through the agency of the knob 35, communication between the pipes 39, 41 is discontinued and communication between the pipe 41 and a pipe 44 is established. The pipe 44 leads from a pilot valve assembly 45 which has a source of supply A. In other words, when the control system is on "Automatic" the fluid pressure from pipe 39 is effective within pipe 41, while when the system is on "Hand" operation the pipe 41 is susceptible to fluid pressure from the pipe 44. Furthermore, continued rotation in either direction of the plug 42, after communication has been established between the pipes 41, 44, causes a variance in the fluid pressure effective in the pipe 44 due to an axial movement of the pilot 46 within the pilot casing 45.

This pilot 46 is shown in greater detail in Fig. 8, for example, but it is only necessary to herein state that axial positioning of the pilot 46 relative to its casing 45 causes a varying in the air pressure within the pipe 44. Such axial positioning is accomplished due to the arrangement wherein rotation of the plug 42 causes rotation of an internally threaded part 47 which carries the pilot 46, and relative to a screw 48 which is in fixed position. The screw 48 and nut 47 have a very fine thread so that, for example, 300 degrees rotation of the plug 42 results in longitudinal or axial motion of the pilot 46 of only a few thousandths of an inch.

The plug 42 is relieved, as indicated at 49, for approximately 300 degrees of its circumference, in a manner for communication between the pipes 41, 44, upon being turned in either direction from the position as shown in Figs. 3, 4. Thus, in general, in the shown position the pressure available within the pipe 41 is that established proportional to or representative of the steam pressure. When the selector switch plug 42 is turned, say, 20 or 30 degrees in either direction from the shown position, the pressure within the pipe 39 is made ineffective and pressure from the pipe 44 is made effective upon the pipe 41, and in degree dependent upon the angle of rotation of the plug 42. Thus, the operator, by hand manipulation of the knob 35, may control the pressure available within the pipe 41, for a purpose to be explained.

The pipe 41 leads to the metallic bellows 8 for positioning the valve 7 and to a Bourdon tube 50 whose free end assumes positions directly proportional to, or representative of, the pressure within the pipe 41, and correspondingly, the pressure of the steam in the conduit 6.

I show for positioning the valve 7 the metallic bellows 8, spring loaded, and through this combination, provide what I term a positioning or geared control of the fuel to the furnace, for there will be a definite throttle position of the valve 7 for every pressure in the pipe 41, the Bourdon tube 50, and the Bourdon tube 40, when the knob 35 is in an automatic position, and such position of the valve 7 and pressure in 41, 50, 40 will be representative of, or directly proportional to, the pressure of the steam in the conduit 6 effective in positioning the Bourdon tube 22. Such control of the valve 7 is representative of control I may utilize where the valve, damper, or other controllable object does not require much power and where it is satisfactory to position it to a position directly related to the value of the variable utilized in its control.

For the control of the damper 11 through the agency of the controller 13, I utilize a fluid pressure carried to the controller 13 through a pipe 51, from a pilot valve assembly 52, to which is supplied air under pressure at A. For positioning the pilot in the assembly 52, I utilize a freely floating beam 53, one end of which is pivotally connected to the pilot, and the other end of which is pivotally connected to a rod 54, which in turn is pivotally connected to a beam 55 intermediate the ends of the beam. To one end of the beam 55 is pivotally connected the free end of the Bourdon tube 50 and to the other end of the beam 55 is pivotally connected a rod 56.

Assuming for the moment that the rod 56 is immovable, then its end connected to the beam 55 forms a fixed pivot for the beam 55, around which the beam is moved in angular positioning by changes in pressure within the Bourdon tube 50. Such angular positioning causes a vertical movement of the rod 54.

To the beam 53 I attach intermediate its ends the free end of a Bourdon tube 57 which is subjected to the pressure within the pipe 51, namely, that pressure controlled by the pilot 52.

Assuming a change in pressure in the Bourdon tube 50 representative of a change in steam pressure, and for an example, an increase in steam pressure, the free end of the Bourdon tube 50 will move upward, carrying the rod 54 upward and pivoting the beam 53 around its connection to the Bourdon tube 57, thereby lowering the pilot in the casing 52 and allowing a greater air pressure from A to be admitted to the pipe 51. Such increased air pressure is effective upon the Bourdon tube 57 causing its free end to move upward and thus raising the pilot 52 through the beam 53 pivoting around the rod 54. A balance will be reached whereby the pressure in 57 will be representative of, or proportional to, that within the Bourdon tube 50, in the manner as was explained relative to the tubes 22, 40.

I show in Fig. 2 an enlarged view of the controller 13, and referring to this view, it will be seen that the pressure pipe 51 enters the fixed end of a metallic bellows 58 whose free end carries the yoke 59 loaded by a spring 60. The free end of the bellows 58 is further connected for positioning a pilot 61 within a casing 62 which is supplied with air under pressure from A. The particular construction and functioning of this type of pilot is illustrated in greater detail at Fig. 5, and will be explained hereinafter. Suffice it to say at the present time that air under pressure is admitted to the pilot casing 62 between two enlarged portions of the pilot 61, which control admission of the said air to pipes 63, 64.

If the pilot 61 is moved upwardly, air is bled to the atmosphere from the pipe 64 and at the same time, air under pressure from A is admitted to the pipe 63. Correspondingly, if the pilot 61 is moved downwardly, air is bled from the pipe 63 and admitted at greater pressure to the pipe 64.

The pipes 63, 64 are connected to opposite ends of a cylinder 65 in which is arranged a piston 66 having a piston rod 67 extending externally of the cylinder, and on whose lower end (Fig. 2) is rigidly fixed a cross bar 68, at one end adapted to position the damper 11 (Fig. 1) and at the other end adapted to carry one end of the loading spring 60.

The functioning of this controller is as follows: Assume that the piston 66 is in the position shown in Fig. 2 and that the pilot 61 is in central position opposite the pipes 63, 64. The pressures on opposite sides of the piston 66 are equalized regardless of their specific value, and thus the piston 66 is not urged to movement. Assume now that pressure within the pipe 51 increases. Such increase in pressure is effective upon the metallic bellows 58, causing its free end to move vertically upward (Fig. 2) carrying therewith the pilot 61, the yoke 59, and elongating the spring 60. Such movement may be in nature only a few thousands of an inch, for immediately upon such movement occurring, with the pilot valve 61 moving upward, air under pressure from the supply A is admitted through the pipe 63 and to the top of the piston 66, while the air which has been trapped in the cylinder 65 below the piston 66, is immediately vented to the atmosphere through the pipe 64. This immediately causes a downward positioning of the piston 66, positioning the damper 11, and putting additional tension upon the spring 60. Such increase in tension on the spring 60 is effective through the yoke 59 upon the free end of the bellows 58, causing an overcoming or balancing of the increased pressure within the bellows 58 and continues until the pilot 61 is returned to its original position, trapping within the cylinder 65 equal pressures on the opposing sides of the piston 66, thereby stopping movement of the piston. A state of equilibrium is reached wherein the piston 66 has assumed a new position, satisfying the increased pressure within the pipe 51 through an increased tension of the spring 60.

On the assumption that the rod 56 is fixed, we have then a positioning of the piston 66 representative of, or directly proportional to, the pressures within 51, 57, 50, 41, 40 and the steam pressure effective within the tube 22. However, in the arrangement illustrated in Fig. 1, I provide possible means for vertically moving the rod 56 to cause a readjustment in positioning of the controller 13 to satisfy conditions subservient to or auxiliary to steam pressure variations. Such conditions are operating conditions appurtenant to the boiler and furnace which lead to variations in operating efficiency and of possible secondary importance to the maintenance of steam outflow pressure. Such conditions I have chosen in the present embodiment to represent as a relationship between steam flow and air flow where the two are measured, as previously mentioned, by the steam flow meter 17 and the air flow meter 25.

It is well known in power plant operation that certain desired relationship exists between steam flow and air flow for best operating efficiency, and that when such relationship is departed from in either direction, there is a loss due to excess or deficiency of air and in other ways, so that it is always desirable to maintain a predetermined inter-relation between steam flow and air flow. Such predetermined relationship and the calibration of the instrumentalities for indicating such relationship is well known and forms no part of the present invention. Suffice it to say that the movable arms 19, 26 of the meters 17, 25 respectively have each pivotally suspended therefrom rods which are pivotally connected to the ends of a floating beam 69, from a point intermediate the ends of which a rod 70 is pivotally suspended. If now the steam flow from the boiler increases, then the indicator 19 moves downwardly relative to the index 20, and if the air flow through the boiler increases, the indicator 26 moves upwardly relative to the index 27. If the increase in steam flow and air flow is the same, or in proper porportions the one to the other, then the movement of the arms 19, 26 is such relative to the moment arms of the beam 69 that there will be no vertical positioning of the rod 70. If, however, the steam flow increases in greater amount than the air flow, there will be a vertical upward positioning of the rod 70 and in like manner for any disturbance of the relation between steam flow and air flow from the desired and predetermined relation, there will be a vertical positioning of the rod 70.

The lower end of the rod 70 is pivotally connected with a contact bar 71, which is pivoted intermediate its ends and carries one-half each of two contacts, and is connected to a power supply 72. The other halves of the two mentioned contacts are connected the one to one field and the other to the other field of a two-field self-starting synchronous alternating current motor 73, adapted to move through a worm and segment 74 the rod 56 for vertical positioning thereof.

The arrangement just described is such that if one of the pairs of contacts is close-circuited, one of the fields of the motor 73 is energized and the rod 56 is positioned upwardly. If the other contact is close-circuited, the opposite field of the motor is energized and the rod 56 is positioned downwardly. Thus the vertical motion of the rod 56 depends upon maintenance of, or departure from, the predetermined relation between steam flow and air flow.

I provide the electrical features just mentioned for positioning the rod 56 rather than connecting the rod 56 mechanically to the rod 70, for the purpose of applying to the rod 56 a slow, gradual movement representative of an integration of the amount of departure of the steam flow-air flow relation and the time length of such departure. It will be understood, however, that in certain constructions I may desirably mechanically connect the rod 70 to the rod 56, eliminating the motor and related parts.

It will be apparent now that positioning of the pilot 52 is first effected by change in pressure at 50, and the controller 13 as well as the fuel supply valve 7, are substantially simultaneously positioned to positions representative of steam pressure. However, following or simultaneous with such control from steam pressure, I may have a readjustment of the position of the damper 11 as dictated by a departure from the desired relationship between steam flow and air flow which is, in effect, the measuring instrumentality I have of operating efficiency.

Another variable in the operation of such a combustion system desirably to be maintained is furnace draft, which I measure with the indicator 28, previously explained. Movement of the indicator 30 relative to the index 31 indicates that the value of draft within the furnace 2 is at the predetermined desirable value or departing in one direction or the other from such predetermined value. From the indicator 30, I actuate a pilot 75 supplied with air under pressure from A and controlling the pressure of air within a pipe 76 which leads to the controller 12. The controller 12 is in general of the type of controller 13 and shown in greater detail at Fig. 2 previously described. Suffice it to say that if furnace draft pressure departs in one direction or the other from predetermined value, the pressure of the air within the pipe 76 is varied proportionally to, or representative of, such departure and for the positioning of the damper 10 and controlling the supply of air to the furnace 2.

An important feature of my invention is the arrangement of pilot valve which I utilize. I will now describe in detail the functioning and advantages of the pilot 61 of Fig. 2, which I have shown to greatly enlarged scale and in sectional detail at Fig. 5, and a portion of which is shown at still greater scale and detail in Fig. 7.

As is common in this art, the pilot 61 comprises a stem having enlargements 77, known as lands, positioned axially in the pilot casing 62 relative to ports for controlling the passage of a pressure fluid therethrough. Air under pressure is admitted to the interior of the pilot casing 62 from a point of supply A, and the positioning therein of the pilot 61 controls air pressure in the discharge pipes 63, 64. Within the casing 62 is a sleeve surrounding the pilot 61 comprising in the present embodiment four sleeve sections 78, 79, 80, 81 of substantially the same exterior and interior dimensions, placed end-to-end within a central bore of the casing 62. As illustrated clearly in Fig. 5, the sleeve sections 78, 81 are similar, and the sleeve sections 79, 80 are similar. Sections 78, 79 form a pair as do sections 80, 81 and the two pair of mating sections are urged apart by a coil spring 82. Over the end of the sections 78, 81, most remote from the center of the casing, are screw threaded the caps 83 which tend, when screwed into place, to urge the sections 78, 79 toward the sections 80, 81 against the action of the spring 82. The arrangement allows accurate machining of the sleeves 78, 79, 80, 81 before they are placed within the casing 62, and accurate location of the sleeves within the casing 62 through the arrangement of caps and compression spring.

It will of course be understood that I might equally as well use any of the ports I designate as discharge ports, for inlet ports and vice versa. For example, I might in certain systems have ports similar to 63, 64 both connected to a supply A and utilize a single discharge port such as the one shown at the opposite side of the assembly. Furthermore, I might have any number of inlet and outlet ports in the same assembly, with appropriate lands as required.

As shown more clearly in Fig. 7, which is an enlarged view of a portion only of Fig. 5, illustrates the abutting part of the sleeve sections 78, 79.

In construction I preferably make the casing 62 of brass, the sleeve sections 78, 79, 80, 81 of Monel, and the lands 77 of Enduro KA2 or similar material. In clearance between the land or ball 77 and the interior of the sleeve sections, I allow something in the nature of .0005 inch. The total axial movement of a pilot such as 61 may be in the nature of .005 inch.

Referring now specifically to Fig. 7, it will be seen that in the sleeve 79 adjacent the opening 63 is an annular groove 84 cut into the exterior of the section 79. At the upper end (Fig. 7) of the section 79 is an annular groove 85 and communication between the annular grooves 84, 85 is established by one or more openings 86. The upper inner end of the sleeve 79 is relieved at 87, forming a thin annular opening for communication between the interior of the sleeve and the annular opening or passage 85.

The land 77 is shown as spherical, although it may be formed of any desired contour, as will be later explained. This pilot has a number of features which distinguishes it clearly from those pilot valves now known in the art which are generally of a type controlling the quantity of fluid through the related port, and are usually of a type which must be returned, either through movement of the pilot stem or of the pilot sleeve, to a shutoff position in order that the functioning of the device, as a whole, will be accomplished in desired manner. The present pilot is in the nature of a positioning device, giving a definite loading pressure at the port for each position of the pilot, rather than a quantity control of flow through the port. Due to the slight amount of clearance between the greatest diameter of the land 77 and the interior of the sleeve portions, there will be a constant leakage or bleed of air from the supply A around the land and to the atmosphere. With the supply of air admitted between the two lands 77 (Fig. 5), there will be a constant bleed or leakage past each land and thus an entirely balanced condition of pressure relative to the pilot stem 61, wherein no end thrust is produced in either direction. Furthermore, it is a well known principle that a spherical, cylindrical, conical or similar shape of object pivoted or held for free movement in a column of flowing fluid, will tend to center itself in the column. Thus, the lands 77 tend to center themselves within the interior of the sleeve portions, allowing substantially uniform leakage at all points of the periphery of the lands, and providing against possible friction in axial movement of the stem 61 for the fluid bled past the lands serves in the nature of lubrication thereof, which, in addition to the fact that the lands are substantially centered and not touching the walls of the sleeves, prevents friction during axial movement. In reality, the valve member 61 does not touch the sleeve at any point and therefore is practically frictionless, as well as being to a certain extent lubricated by the air bleeding past it at all points of the periphery. Moreover, even though the member should not be properly aligned with respect to the sleeve and was not substantially centered in the column of bleed air, there would actually be nothing but a line contact at the greatest diameter of the lands, so that the friction would be extremely slight.

With a constant bleed of air past the lands 77 to the atmosphere and full supply pressure at the interior of the sleeves between the lands, there will be a definite gradation of pressure from the space 88, interior of the sleeve 79 and surrounding the stem 61, to the point of least clearance between the lands 77 and the sleeves, namely, the point of greatest diameter of the lands 77.

Surrounding the land in the shown position is the narrow outlet or discharge port 87, which may be only a few thousandths of an inch in a dimension axial of the assembly. A definite air pressure will exist in the port 87, depending upon the axial positioning of the lands 77, and for every point of such positioning (upward in Fig. 7) until full pressure of the space 88 is effective at 63.

The arrangement is further characterized by the annular port 87 which is employed. Due to the principle of operation that a pressure is picked off along the land 77, the ports 87 must be of very small size relative to the land. By having an annular port as shown, the width of the port may be decreased to a very few thousandths of an inch, while the total area for effectiveness of pressure is such width multiplied by the circumference at the point adjacent the land, or a substantial area opening. The annular port of this type has the further advantage in that there is no pressure reaction tending to throw the valve member to one side or the other of the sleeve. All these features of the arrangement combine to provide a pilot valve capable of being positioned within its casing with a minimum of effort, as it has substantially a lubricated non-frictional movement with a minimum of end thrust. The control of pressure fluid by the pilot is in the nature of supplying to the port and part under control a pressure accurately depending upon the axial positioning of the pilot within its casing, and wherein such pressure-position relation may be definitely controlled by the shaping of the land 77. For example, the land 77 does not need to be spherical in shape, but may be of truncated conical section, such as is illustrated in Figs. 8, 9.

The pilot 46 of Fig. 3 is shown of the general type of Fig. 8, wherein the land is greatly elongated in either direction from its point of maximum diameter and with a very slow taper. This provides for a much greater axial movement of the pilot between minimum and maximum possible pressure of the pressure fluid. In other words, rather than a total movement of a few thousandths of an inch, as is desirable with the spherical type of land, the double conical or single conical type, or one of substantially the same nature, may be designed for a total movement of thirty-seconds or even sixteenths of an inch, or more, if desired. Within practical limits, the movement is dependent entirely upon the amount of taper.

At Fig. 6 I show an arrangement similar to that of Fig. 5, except that herein I illustrate the sleeve section 80, 81 replaced by a single sleeve section 89 which serves the purpose of blanking off entrance to the discharge opening 64B. I might equally as well have shown this with the blank sleeve 89 at the upper end of the assembly, blanking passage to 76, as would be the arrangement presumed at 38. The arrangement of Fig. 6 is similar to that of the pilots 45, 75, for example. This arrangement allows the control of a pressure fluid to a single outlet without materially changing the parts or assembly thereof of the pilot valve as a whole.

In general, I have illustrated and described as applied to the control of combustion, a pneumatically actuated control system, in which certain parts of the combination are of novel construction, and the whole combined to form an improved, useful and highly novel arrangement. It will be understood that while I have illustrated and described the present invention as utilizing air under pressure as a pressure fluid, it may equally as well be considered in connection with the use of oil, water or any similar fluid which is controlled to provide an amplified power means in novel arrangement. Furthermore, that while I have illustrated and described the use of my instrumentalities in the control of combustion to a vapor-generator, such as not a limiting factor for I might equally as well utilize the novel features of my invention in connection with the control of variables, or for positioning objects, etc. In any event, it is understood that the showing is illustrative and that I am to be limited only by the claims in view of prior art.

In connection with the invention herein disclosed it is to be noted that subject matter not herein claimed is disclosed and claimed in my copending application Serial No. 673,212, filed May 27, 1933, which is a division of this application.

What I claim as new, and desire to secure by Letters Patent of the United States, is:

1. A selector switch for a pressure fluid actuated control system comprising in combination, a valve having an outlet port and two inlet ports, a manually operated means for selectively connecting said outlet port with either of said inlet ports, and means operated in unison with said first-named means for establishing a fluid pressure at one of said inlet ports in accordance with the position of said first-named means.

2. A selector switch for a fluid pressure actuated control system comprising in combination, a valve having an outlet port and a plurality of inlet ports, a manually operated means for selectively connecting said outlet port with any one of said inlet ports, automatic means for regulating the fluid pressure at one of said inlet ports, and means operated by said first-named means for controlling the fluid pressure at another of said inlet ports.

3. A selector switch for a fluid pressure actuated control system comprising in combination, a valve having an outlet port and a plurality of inlet ports, manually operated means for selectively connecting said outlet port with any one of said inlet ports, a source of pressure fluid connected to said inlet ports, automatic means for controlling the pressure fluid at one of said inlet ports, and a pilot valve operated in unison with said manually operated means for controlling the pressure fluid at another of said inlet ports.

4. A selector switch for a pressure fluid actuated control system comprising in combination, a valve having a plurality of ports, a manually operated means for selectively connecting two of said ports, and means operated in unison with said first-named means for establishing a fluid pressure at one of said ports in accordance with the position of said first-named means.

5. A selector switch for a pressure fluid actuated control system comprising in combination, a valve having a plurality of inlet and outlet ports, a manually operated means for selectively connecting an inlet with an outlet port, and means operated in unison with said first-named means for establishing a fluid pressure at one of the inlet ports in accordance with the position of said first-named means.

6. A selector switch for a fluid pressure actuated control system comprising in combination, a valve having a plurality of ports, a manually operated means for selectively connecting two of said ports, automatic means for regulating the fluid pressure at one of said ports, and means operated in unison with said first-named means for controlling the fluid pressure at another of said ports.

7. A fluid pressure actuated control system comprising in combination, means for controlling a variable automatically responsive to a second variable, and manually actuated means for selectively making effective said first-named means, said last-named means adapted to establish a fluid pressure of value depending upon its positioning for controlling the first variable after said first-named means has been rendered ineffective.

8. In a combustion control system for a vapor-generator in combination, means responsive to vapor pressure for establishing a fluid pressure for control of the elements of combustion, and a selector switch for making said means ineffective and for thereafter establishing a fluid pressure for controlling the supply of the elements of combustion.

9. In a combustion control system for controlling the rate of supply of the elements of combustion to the furnace of a vapor-generator, in combination, means sensitive to the pressure of the vapor generated, means under the control of said means for establishing a first fluid pressure in accordance with the pressure of the vapor generated, a regulator for one of the elements of combustion positioned in accordance with the first fluid pressure, means for determining the ratio between the rate of vapor outflow and the rate of supply of an element of combustion, means for establishing a second fluid pressure in accordance with the magnitude of the first fluid pressure and said ratio, and a regulator for another of the elements of combustion positioned in accordance with the second fluid pressure.

10. In combustion control apparatus for vapor-generators, means responsive to the vapor pressure, means under the control of said first-named means for establishing a fluid pressure in accordance with the vapor pressure, regulating means of the rate of supply of an element of combustion controlled by said pressure fluid, means for determining the ratio between the rate of vapor outflow and the rate of supply of an element of combustion, and means actuated by said ratio determining means for modifying the control of said regulating means by said fluid pressure.

11. In combustion control apparatus for vapor-generators, means for establishing a first fluid pressure in accordance with the pressure of the vapor generated, means for establishing a second fluid pressure in accordance with the first fluid pressure and the rate of vapor outflow, and regulating means for an element of combustion actuated by said second fluid pressure.

12. A fluid pressure-operated control system comprising in combination, means for establishing a first fluid pressure in accordance with the magnitude of a variable, pressure sensitive means positioned by said first fluid pressure, means for determining the magnitude of a factor maintaining or producing said variable, a movable member actuated by said last named means, an operative connection between said pressure sensitive means and said movable member, valve means actuated by said operative connection for establishing a second fluid pressure for controlling the rate of supply of said factor, and means sensitive to said second fluid pressure for placing the system in equilibrium when said second fluid pressure is a function of the movement of said operative connection.

13. A fluid pressure-operated control system comprising in combination, means for establishing a first fluid pressure in accordance with the magnitude of a variable, pressure sensitive means positioned by said first fluid pressure, means for determining the magnitude of a factor maintaining or producing said variable, a movable member positioned by said last named means, an operative connection between said pressure sensitive means and said movable member positioned in accordance with the algebraic sum of the movements of said pressure sensitive means and said movable member from an initial position, and valve means actuated by said operative connection for establishing a second fluid pressure for controlling said factor.

14. In combination, a steam generator heated by a furnace, fuel supply means for the furnace, air supply means for the furnace, a damper controlling discharge of gases from the furnace, means sensitive to departure of steam outflow pressure from a predetermined standard, a steam outflow meter, a meter of the air and products of combustion leaving the furnace, ratio determining means for said meters, a pressure fluid under the control of said pressure sensitive means for positioning said fuel supply means and said damper, means under the control of said ratio determining means for modifying the control of said pressure fluid by said pressure sensitive means effective for positioning said damper, and means for rendering said fluid pressure ineffective for positioning said fuel supply means and said damper.

15. In combination, a steam generator heated by a furnace, fuel supply means for the furnace, air supply means for the furnace, a damper controlling discharge of gases from the furnace, means sensitive to departure of steam outflow pressure from a predetermined standard, a steam outflow meter, a meter of the air and products of combustion leaving the furnace, ratio determining means for said meters, a pressure fluid under the control of said pressure sensitive means for positioning said fuel supply means and said damper, means under the control of said ratio determining means for modifying the control of said pressure fluid by said pressure sensitive means effective for positioning said damper, and means for rendering said fluid pressure ineffective for positioning said fuel supply means and said damper and thereafter establishing a second fluid pressure for positioning said fuel supply means and said damper.

16. In a combustion control system in combination, a furnace, air supply means for the furnace, fuel supply means for the furnace, a meter of the air and products of combustion leaving the furnace, valve means under the control of said meter for establishing a fluid pressure for controlling the rate of air supply to the furnace, and manually-operated means for establishing a second fluid pressure adapted to modify the control of said valve means by said meter.

17. In a combustion control system for a steam boiler, in combination, a furnace, air supply means for the furnace, fuel supply means for the furnace, a meter for the steam outflow from the boiler, valve means under the control of said meter for establishing a fluid pressure for controlling the rate of air supply to the furnace, and manually-operated means for establishing a second fluid pressure adapted to modify the control of said valve means by said meter.

18. In a combustion control system for a steam boiler, in combination, a furnace, air supply means for the furnace, fuel supply means for the furnace, a meter of the air and products of combustion leaving the furnace, a meter of the steam outflow from the boiler, ratio determining means for said meters, valve means under the control of said ratio determining means for establishing a fluid pressure for controlling the rate of air supply to the furnace, and manually-operated means for establishing a second fluid pressure adapted to modify the control of said valve means by said ratio determining means.

19. In a combustion control system, in combination, a furnace, means for supplying the elements of combustion to said furnace, a meter of the products of combustion leaving the furnace, a movable member positioned by said meter, a reversible motor, valve means partially positioned by said motor for establishing a fluid pressure for controlling the rate of supply of an element of combustion to said furnace, and contact means for actuating said motor to maintain the rate of flow of the products of combustion at a predetermined value actuated by said movable member.

20. In a combustion control system in combination, means for supplying the elements of combustion to the furnace, manually-operated means for establishing a fluid pressure in accordance with the desired rate of flow of the products of combustion from said furnace, a meter for determining the actual rate of flow of the products of combustion, and means for establishing a second fluid pressure for controlling the rate of supply of element of combustion in accordance with the difference between the desired rate of flow of the products of combustion and the actual rate of flow.

21. In a combustion control system for a steam boiler in combination, means for supplying the elements of combustion to the furnace, manually-operated means for establishing a fluid pressure in accordance with the desired rate of steam outflow from the boiler, a meter for determining the actual rate of steam outflow from the boiler, and means for establishing a second fluid pressure for controlling the rate of supply of an element of combustion in accordance with the difference between the desired rate of steam outflow from the boiler and the actual rate of flow.

22. In a combustion control system for controlling the rate of supply of the elements of combustion to the furnace of a vapor generator, in combination, means sensitive to the pressure of the vapor generated, means under the control of said last named means for establishing a first fluid pressure in accordance with the pressure of the vapor generated, a regulator for one of the elements of combustion positioned in accordance with the first fluid pressure, means for determining the ratio between the rates of supply of the elements of combustion, means for establishing a second fluid pressure in accordance with said ratio, a regulator for another of the elements of combustion partially positioned in accordance with the second fluid pressure, and means for rendering said first fluid pressure ineffective for positioning said regulators and simultaneously modifying said second fluid pressure.

23. In combination with a movable piston, a movable valve member having a neutral position for regulating the flow of a pressure fluid for moving said piston, a pressure sensitive expansible-contractible bellows axially aligned with and adapted to position said member from a neutral position in accordance with changes in pressure within said bellows, and means for restoring said valve member to the neutral position when the movement of said piston is in proportion to the change in pressure within said bellows comprising a spring axially aligned with said bellows and movable valve member having one end moved by said piston and the other secured to said bellows.

24. A fluid pressure operated servo-motor comprising in combination, a cylinder, a movable piston therein, a piston rod extending without said cylinder and moved by said piston, a valve having a movable member for controlling the pressures effective on either side of said piston normally in a neutral position whereby equal and opposite pressures act on said piston, means for displacing said member from the neutral position comprising a pressure sensitive bellows axially aligned with said member and having a movable abutment connected thereto whereby changes in pressure within said bellows are effective for moving said member from the neutral position, and means for restoring said member to the neutral position when the movement of said piston is proportional to the change in pressure within said bellows comprising a spring axially aligned with said member and bellows and having one end connected to said abutment and the other end moved by said piston rod.

CLARENCE JOHNSON.